US010794293B2

(12) United States Patent
Adams et al.

(10) Patent No.: US 10,794,293 B2
(45) Date of Patent: Oct. 6, 2020

(54) TURBINE SECTION OF HIGH BYPASS TURBOFAN

(71) Applicant: United Technologies Corporation, Farmington, CT (US)

(72) Inventors: Paul R. Adams, Glastonbury, CT (US); Shankar S. Magge, South Windsor, CT (US); Joseph B. Staubach, Colchester, CT (US); Wesley K. Lord, South Glastonbury, CT (US); Frederick M. Schwarz, Glastonbury, CT (US); Gabriel L. Suciu, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/025,094

(22) Filed: Jul. 2, 2018

(65) Prior Publication Data
US 2019/0048803 A1 Feb. 14, 2019

Related U.S. Application Data

(63) Continuation of application No. 15/292,472, filed on Oct. 13, 2016, now Pat. No. 10,060,357, which is a
(Continued)

(51) Int. Cl.
*F02C 7/36* (2006.01)
*F02C 3/107* (2006.01)
(Continued)

(52) U.S. Cl.
CPC .............. *F02C 7/36* (2013.01); *F01D 5/06* (2013.01); *F01D 11/122* (2013.01); *F01D 25/24* (2013.01);
(Continued)

(58) Field of Classification Search
CPC . F02K 3/06; F02K 3/072; F02K 3/068; F02K 3/04; F02C 3/107; F02C 3/04; F02C 7/36
See application file for complete search history.

(56) References Cited

U.S. PATENT DOCUMENTS

| 2,258,792 A | 4/1941 | New |
| 2,936,655 A | 5/1960 | Peterson et al. |

(Continued)

FOREIGN PATENT DOCUMENTS

| EP | 0791383 | 8/1997 |
| EP | 1142850 | 10/2001 |

(Continued)

OTHER PUBLICATIONS

Honeywell LF507. Jane's Aero-engines, Aero-engines—Turbofan. Feb. 9, 2012.
(Continued)

*Primary Examiner* — Craig Kim
(74) *Attorney, Agent, or Firm* — Carlson, Gaskey & Olds, P.C.

(57) ABSTRACT

A turbofan engine according to an example of the present disclosure includes, among other things, an engine case and a gaspath through the engine case. A fan has a circumferential array of fan blades. The engine further has a compressor, a combustor, a gas generating turbine, and a low pressure turbine section. A speed reduction mechanism couples the low pressure turbine section to the fan. A bypass area ratio is greater than about 6.0. The low pressure turbine section airfoil count to bypass area ratio is below about 170.

27 Claims, 4 Drawing Sheets

Related U.S. Application Data continuation of application No. 14/793,785, filed on Jul. 8, 2015, which is a continuation-in-part of application No. 14/692,090, filed on Apr. 21, 2015, which is a continuation of application No. 13/599,175, filed on Aug. 30, 2012, now Pat. No. 9,010,085, which is a continuation of application No. 13/475,252, filed on May 18, 2012, now Pat. No. 8,844,265, which is a continuation-in-part of application No. 11/832,107, filed on Aug. 1, 2007, now Pat. No. 8,256,707.

(60) Provisional application No. 61/593,190, filed on Jan. 31, 2012, provisional application No. 61/498,516, filed on Jun. 17, 2011.

(51) Int. Cl.

| | |
|---|---|
| *F02C 9/18* | (2006.01) |
| *F02K 3/06* | (2006.01) |
| *F02K 3/075* | (2006.01) |
| *F01D 5/06* | (2006.01) |
| *F01D 25/24* | (2006.01) |
| *F02C 3/04* | (2006.01) |
| *F02C 7/20* | (2006.01) |
| *F04D 19/02* | (2006.01) |
| *F01D 11/12* | (2006.01) |

(52) U.S. Cl.
CPC ............... *F02C 3/04* (2013.01); *F02C 3/107* (2013.01); *F02C 7/20* (2013.01); *F02C 9/18* (2013.01); *F02K 3/06* (2013.01); *F02K 3/075* (2013.01); *F04D 19/02* (2013.01); *F05B 2250/283* (2013.01); *F05D 2220/32* (2013.01); *F05D 2220/323* (2013.01); *F05D 2240/35* (2013.01); *F05D 2240/60* (2013.01); *F05D 2260/40311* (2013.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,327,971 A | 6/1967 | Stewart et al. |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,814,549 A | 6/1974 | Cronstedt |
| 3,820,719 A | 6/1974 | Clark |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,037,809 A | 7/1977 | Legrand |
| 4,044,973 A | 8/1977 | Moorehead |
| 4,130,872 A | 12/1978 | Harloff |
| 4,266,741 A | 5/1981 | Murphy |
| 4,284,174 A | 8/1981 | Salvana et al. |
| 4,289,360 A | 9/1981 | Zirin |
| 4,313,711 A | 2/1982 | Lee |
| 4,478,551 A | 10/1984 | Honeycutt, Jr. et al. |
| 4,595,340 A | 6/1986 | Klassen et al. |
| 4,649,114 A | 3/1987 | Miltenburger et al. |
| 4,696,156 A | 9/1987 | Burr et al. |
| 4,966,338 A | 10/1990 | Gordon |
| 4,969,325 A | 11/1990 | Adamson et al. |
| 4,979,362 A | 12/1990 | Vershure, Jr. |
| 5,102,379 A | 4/1992 | Pagluica et al. |
| 5,136,839 A | 8/1992 | Armstrong |
| 5,141,400 A | 8/1992 | Murphy et al. |
| 5,174,525 A | 12/1992 | Schilling |
| 5,273,393 A | 12/1993 | Jones et al. |
| 5,275,357 A | 1/1994 | Seelen et al. |
| 5,277,382 A | 1/1994 | Seelen et al. |
| 5,317,877 A | 6/1994 | Stuart |
| 5,320,307 A | 6/1994 | Spofford et al. |
| 5,361,580 A | 11/1994 | Ciokajlo et al. |
| 5,372,338 A | 12/1994 | Carlin et al. |
| 5,409,184 A | 4/1995 | Udall et al. |
| 5,433,674 A | 7/1995 | Sheridan et al. |
| 5,443,229 A | 8/1995 | O'Brien et al. |
| 5,447,411 A | 9/1995 | Curley et al. |
| 5,452,575 A | 9/1995 | Freid |
| 5,466,198 A | 11/1995 | McKibbin et al. |
| 5,474,258 A | 12/1995 | Taylor et al. |
| 5,497,961 A | 3/1996 | Newton |
| 5,524,847 A | 6/1996 | Brodell et al. |
| 5,677,060 A | 10/1997 | Terentieva et al. |
| 5,746,391 A | 5/1998 | Rodgers et al. |
| 5,778,659 A | 7/1998 | Duesler et al. |
| 5,810,287 A | 9/1998 | O'Boyle et al. |
| 5,857,836 A | 1/1999 | Stickler et al. |
| 5,860,276 A | 1/1999 | Newton |
| 5,871,175 A | 2/1999 | Demouzon et al. |
| 5,871,176 A | 2/1999 | Demouzon et al. |
| 5,871,177 A | 2/1999 | Demouzon et al. |
| 5,915,917 A | 6/1999 | Eveker et al. |
| 5,921,500 A | 7/1999 | Ellis et al. |
| 5,927,644 A | 7/1999 | Ellis et al. |
| 5,975,841 A | 11/1999 | Lindemuth et al. |
| 5,985,470 A | 11/1999 | Spitsberg et al. |
| 6,106,233 A | 8/2000 | Walker et al. |
| 6,126,110 A | 10/2000 | Seaquist et al. |
| 6,138,949 A | 10/2000 | Manende et al. |
| 6,189,830 B1 | 2/2001 | Schnelz et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,474,597 B1 | 11/2002 | Cazenave |
| 6,478,545 B2 | 11/2002 | Crall et al. |
| 6,517,027 B1 | 2/2003 | Abruzzese |
| 6,517,341 B1 | 2/2003 | Brun et al. |
| 6,524,072 B1 | 2/2003 | Brownell et al. |
| 6,607,165 B1 | 8/2003 | Manteiga et al. |
| 6,619,030 B1 | 9/2003 | Seda et al. |
| 6,652,222 B1 | 11/2003 | Wojtyczka et al. |
| 6,708,925 B2 | 3/2004 | Udall |
| 6,709,492 B1 | 3/2004 | Spadaccini et al. |
| 6,814,541 B2 | 11/2004 | Evans et al. |
| 6,899,518 B2 | 5/2005 | Lucas et al. |
| 6,935,591 B2 | 8/2005 | Udall |
| 7,021,042 B2 | 4/2006 | Law |
| 7,021,585 B2 | 4/2006 | Loewenstein et al. |
| 7,055,330 B2 | 6/2006 | Miller et al. |
| 7,134,286 B2 | 11/2006 | Markarian et al. |
| 7,328,580 B2 | 2/2008 | Lee et al. |
| 7,374,403 B2 | 5/2008 | Decker et al. |
| 7,445,433 B2 | 11/2008 | Chivers et al. |
| 7,591,754 B2 | 9/2009 | Duong et al. |
| 7,654,075 B2 | 2/2010 | Udall |
| 7,662,059 B2 | 2/2010 | McCune |
| 7,677,493 B2 | 3/2010 | Diochon et al. |
| 7,694,505 B2 | 4/2010 | Schilling |
| 7,806,651 B2 | 10/2010 | Kennepohl et al. |
| 7,824,305 B2 | 11/2010 | Duong et al. |
| 7,828,682 B2 | 11/2010 | Smook |
| 7,841,165 B2 | 11/2010 | Orlando et al. |
| 7,926,260 B2 | 4/2011 | Sheridan et al. |
| 7,997,868 B1 | 8/2011 | Liang et al. |
| 8,205,432 B2 | 6/2012 | Sheridan |
| 8,834,099 B1 | 9/2014 | Topol et al. |
| 8,869,504 B1 | 10/2014 | Schwarz et al. |
| 2001/0010798 A1 | 8/2001 | Dailey et al. |
| 2002/0172593 A1 | 11/2002 | Udall |
| 2003/0163984 A1 | 9/2003 | Seda et al. |
| 2006/0090448 A1 | 5/2006 | Henry et al. |
| 2006/0228206 A1 | 10/2006 | Decker et al. |
| 2006/0248900 A1 | 11/2006 | Suciu et al. |
| 2008/0003096 A1 | 1/2008 | Kohli et al. |

(56) References Cited

U.S. PATENT DOCUMENTS

| | | |
|---|---|---|
| 2008/0098718 A1 | 5/2008 | Henry et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0092487 A1 | 4/2009 | McCune et al. |
| 2009/0185908 A1 | 7/2009 | Chung et al. |
| 2009/0304473 A1 | 12/2009 | Holze et al. |
| 2009/0304518 A1 | 12/2009 | Kodama et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0259013 A1 | 10/2010 | Schreiber |
| 2010/0331139 A1 | 12/2010 | McCune |
| 2011/0056183 A1 | 3/2011 | Sankrithi et al. |
| 2011/0123326 A1 | 5/2011 | DiBenedetto et al. |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0251306 A1 | 10/2012 | Reinhardt et al. |
| 2012/0291449 A1 | 11/2012 | Adams et al. |
| 2013/0186058 A1 | 7/2013 | Sheridan et al. |
| 2013/0224003 A1 | 8/2013 | Kupratis et al. |
| 2014/0174056 A1 | 6/2014 | Suciu et al. |
| 2015/0089958 A1 | 4/2015 | Suciu et al. |
| 2015/0233303 A1 | 8/2015 | Sheridan et al. |
| 2015/0377122 A1 | 12/2015 | Adams et al. |

FOREIGN PATENT DOCUMENTS

| | | |
|---|---|---|
| EP | 1617044 | 1/2006 |
| EP | 2359975 | 8/2011 |
| EP | 2535548 | 12/2012 |
| EP | 3115576 | 1/2017 |
| GB | 1516041 | 6/1978 |
| GB | 2010969 | 7/1979 |
| GB | 2041090 | 9/1980 |
| GB | 2426792 | 12/2006 |
| GB | 2440345 A | 1/2008 |
| WO | 2007038674 | 4/2007 |
| WO | 2014152101 | 9/2014 |

OTHER PUBLICATIONS

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 50-62, 85-87, 95-104, 121-123, 223-234, 242-245, 278-280, 303-309, 323-326, 462-479, 517-520, 563-565, 673-675, 582-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E (2007). Turbofan and turbojet engines database handbook. Editions Elodie Roux. Blagnac: France. pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003. p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compound. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28 (9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on Sic fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

(56) References Cited

OTHER PUBLICATIONS

Jacobson, N.S. (1993). Corrosion of silicon-based ceramics in combustion environments. J. Am. Ceram. Soc. 76 (1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Winn, A. (Ed). (1990). Wide Chord Fan Club. Flight International, 4217(137). May 23-29, 1990. pp. 34-38.

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Dudley, D.W., Ed. (1962). Handbook of practical gear design. Lancaster, PA: Technomic Publishing Company, Inc. pp. 3.96-102 and 8.12-18.

Dudley, D.W., Ed. (1962). Gear handbook. New York, NY: McGraw-Hill. pp. 3.14-18 and 12.7-12.21.

Dudley, D.W., Ed. (1994). Practical gear design. New York, NY: McGraw-Hill. pp. 119-124.

Product Brochure. Garrett TFE731. Allied Signal. Copyright 1987. pp. 1-24.

Honeywell Learjet 31 and 35136 TFE731-2 to 2C Engine Upgrade Program. Sep. 2005. pp. 1-4.

Honeywell Sabreliner 65 TFE731-3 to -3D Engine Upgrade Program. Oct. 2005. pp. 1-4.

U.S. Department of Transportation: Federal Aviation Administration Type Certificate Data Sheet No. E6WE. Dated: May 9, 2000. p. 1-.

Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (56) References Cited

OTHER PUBLICATIONS (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.N. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 50-62, 85-87, 95-104, 121-123, 223-234, 242-245, 278-285, 303-309, 323-326, 462-479, 517-520, 563-565, 630-632, 568-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retrieved from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009. Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.

(56) References Cited

OTHER PUBLICATIONS

Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Munt, R. (1981). Aircraft technology assessment: Progress in low emissions engine. Technical Report. May 1981. pp. 1-171.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Aug. 17, 2016.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (Cat C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). NASA Technical Paper. Nov. 1979. pp. 1-68.
Notice of Opposition for European Patent No. 2535548 (13813216.2) dated Apr. 29, 2019 by Safran Aircraft Engines.
Rolly-Royce RB211. Jane's Aero-Engines. Jane's by IHS Markit. Feb. 24, 2010.
Petition for Inter Partes Review of U.S. Pat. No. 9,709,070. *General Electric Company*, Petitioner, v. *United Technologies Corporation*, Patent Owner. IPR2020-00083. Oct. 23, 2019.
Mattingly, J.D. (1996). Elements of gas turbine propulsion. New York, New York: McGraw-Hill, Inc. pp. 1-18, 50-62, 85-87, 95-104, 121-123, 223-234, 242-245, 278-285, 303-309, 323-326, 462-479, 517-520, 563-565, 630-632, 573-675, 682-685, 697-699, 703-705, 802-805, 862-864, and 923-925.
Walsh, P.P. and Fletcher, P. (2004). Gas turbine performance, 2nd Edition. Oxford, UK: Blackwell Science. pp. 186-191.
Koff, B.L. (2003). Gas turbine technology evolution—A designers perspective. AIAA/ICAS International Air and Space Symposium and Exposition. Jul. 14-16, 2003. AIAA 2003-2722. pp. 1-15.
Tapken, U., Raitor, T., and Enghardt, L. (2009). Tonal noise radiation from an UHBR fan-optimized in-duct radial mode analysis. AIAA/CEAS Aeroacoustics Conference. May 11-13, 2009. AIAA 2009-3288. pp. 1-15.
Gray, D.E. and Gardner, W.B. (1983). Energy efficient engine program technology benefit/cost study—vol. 2. NASA CR-174766. Oct. 1983. pp. 1-118.
The European Search Report for EP Application No. 19184027.1, dated Nov. 25, 2019.
Summons to Attend Oral Proceedings for EP Application No. 16178679.3 dated Sep. 17, 2019.

(56) References Cited

OTHER PUBLICATIONS

Office Action for U.S. Appl. No. 14/102,764 dated Feb. 21, 2014.
General Electric F101. Janes's Aero-Engines. Jane's by IHS Markit. Oct. 11, 2012.
General Electric F101. Scramble—The Aviation Magazine. Oct. 24, 2011. Retrieved May 17, 2013 from: http://wiki.scramble.nl/index.php?title=General_Electric_F101#F101-GE-100.
Notice of Allowance and allowed claims for U.S. Appl. No. 13/475,252 dated May 27, 2014.
Notice of Allowance and allowed claims for U.S. Appl. No. 14/102,764 dated May 30, 2014.
Applicant-Admitted Prior Art: V2500 Fact Sheet, International Aero Engines, http://i-a-e.com/wp-content/uploads/2012/03/facts.pdf Jun. 15, 2012.
Applicant-Admitted Prior Art: Diagram "GE 90 Engine Airflow" http://ctr-sgi1.stanford.edu/CITS/ge90.html downloaded Jun. 15, 2012.
Applicant-Admitted Prior Art: TFE 731-20 PR Sheet, http://design.ae.utexas.edu/subject/work/TFE731_4.jpg downloaded Jun. 15, 2012.
Applicant-Admitted Prior Art: Rolls Royce Trent 800, cutaway view, http://www.epower-propulsion.com/epower/gallery/ABP-RR%20Trent%20800%20cutaway.htm downloaded Jun. 15, 2012.
Applicant-Admitted Prior Art: Rolls-Royce Trent cutaway view from http://web.mit.edu/aeroastro/labs/gtl/early_GT_history_html downloaded Jun. 15, 2012.
Applicant-admitted prior art: Garrett TFE 731-3 sectional view from http://perso.ovh.net/~caeaxtke/fr/coll/falcon50_5.html downloaded Jun. 15, 2012.
Applicant-admitted prior art: Rolls-Royce Trent 1000 cutaway view from http://hackedgadgets.com/2011/08/02/how-to-build-a-rolls-royce-trent-1000-jet-engine-used-in-the-boeing-787/ downloaded Jun. 15, 2012.
Applicant-admitted prior art: Rolls-Royce Trent cutaway view from http://www.warandtactics.com/smf/planet-earth-the-serious-stuff-non-mil-news/a-380-emergency-landing!/ downloaded Jun. 15, 2012.
Ivchenko-Progress AI-727M. Jane's Aero-Engines. Jane's by IHS Markit. Nov. 11, 2017.
Rolls-Royce M45H. Jane's Aero-Engines. Jane's by IHS Markit. Feb. 24, 2010.
Turbomeca Aubisque. Jane's Aero-Engines. Jane's by IHS Markit. Nov. 2, 2009.
Aviadvigatel D-110. Jane's Aero-Engines. Jane's by IHS Markit. Jun. 1, 2010.
Honeywell LF502. Jane's Aero-Engines. Jane's by IHS Markit. Feb. 9, 2012.
Honeywell LF507. Jane's Aero-Engines. Jane's by IHS Markit. Feb. 9, 2012.
Honeywell TFE731. Jane's Aero-Engines. Jane's by IHS Markit. Jul. 18, 2012.
Ivchenko-Progress D-727. Jane's Aero-Engines. Jane's by IHS Markit. Feb. 7, 2007.
Ivchenko-Progress D-436. Jane's Aero-Engines. Jane's by IHS Markit. Feb. 8, 2012.
Applicant-Admitted Prior Art: Flight International, Avco Lycoming ALF502F-2 Cutaway, 2007, http://www.flightglobal.com/airspace/media/aeroenginesjetcutaways/avco-lycoming-alf502r-2-cutaway-5582.aspx.
Applicant-Admitted Prior Art: Flight International, Avco Lycoming LF507F Cutaway, 2007, http://www.flightglobal.com/airspace/media/aeroenginesjetcutaways/avco-lycoming-alf502r-2-cutaway-5582.aspx.
Applicant-Admitted Prior Art: Flight International, Avco Lycoming TFE531 Cutaway, 2007, http://www.flightglobal.com/airspace/media/aeroenginesjetcutaways/avco-lycoming-alf502r-2-cutaway-5582.aspx.
Decision for Inter Partes Review of U.S. Pat. No. 8,844,265. Claims 1, 2, 6-16, and 20. *General Electric Company*, Petitioner v. *United Technologies Corporation*, Patent Owner. Entered Date of Jan. 3, 2017.
European Search Report for European Application No. 16178668.6 dated Nov. 22, 2016.
Sabnis, J. (2010). The PW1000G PurePower new engine concept and its impact on MRO. Av Week Engine MRO Forum. Dec. 1, 2010. pp 1-45.
European Search Report for European Application No. 16178691.8 dated Dec. 7, 2016.
European Search Report for European Application No. 16178679.3 dated Dec. 1, 2016.
Reuters. (2014). GE exec says avoided geared design in jet engine battle with Pratt. Retrieved from: https://www.reuters.com/article/us-general-electric-united-tech-engine/ge-exec-says-avoided-geared-design-in-jet-engine-battle-with-pratt-idUSKBN0HA2H620140915.
Schairer, E.T. (1977). Recent conceptual design studies of single turbofan engine aircraft. Society of Automotive Engineers. Business Aircraft Meeting. Mar. 29-Apr. 1, 1977. pp. 1-17, Table 1 and Figures 1-15.
European Search Report for European Patent Application No. 19184028.9 completed Oct. 10, 2019.
Third Party Observation submitted by Rolls-Royce Plc for European Patent Application No. 18184558.7 dated Dec. 17, 2019.

TURBINE SECTION OF HIGH BYPASS TURBOFAN

CROSS-REFERENCE TO RELATED APPLICATION

This application is a continuation of U.S. patent application Ser. No. 15/292,472, filed Oct. 13, 2016, which is a continuation of U.S. patent application Ser. No. 14/793,785, filed Jul. 8, 2015, which is a continuation-in-part of U.S. patent application Ser. No. 14/692,090, filed Apr. 21, 2015, which was a continuation of U.S. patent application Ser. No. 13/599,175, filed Aug. 30, 2012, which was a continuation of U.S. patent application Ser. No. 13/475,252, now U.S. Pat. No. 8,844,265, issued Sep. 30, 2014, filed May 18, 2012, which was a continuation-in-part of U.S. patent application Ser. No. 11/832,107, filed Aug. 1, 2007, and claimed the benefit of U.S. Patent Provisional Application No. 61/593,190, filed Jan. 31, 2012, and U.S. Provisional Application No. 61/498,516, filed Jun. 17, 2011.

BACKGROUND

The disclosure relates to turbofan engines. More particularly, the disclosure relates to low pressure turbine sections of turbofan engines which power the fans via a speed reduction mechanism.

There has been a trend toward increasing bypass ratio in gas turbine engines. This is discussed further below. There has generally been a correlation between certain characteristics of bypass and the diameter of the low pressure turbine section sections of turbofan engines.

SUMMARY

One aspect of the disclosure involves a turbofan engine having an engine case and a gaspath through the engine case. A fan has a circumferential array of fan blades. The engine further has a compressor in fluid communication with the fan, a combustor in fluid communication with the compressor, a turbine in fluid communication with the combustor, wherein the turbine includes a low pressure turbine section having 3 to 6 blade stages. A speed reduction mechanism couples the low pressure turbine section to the fan. A bypass area ratio is greater than about 6.0. A ratio of the total number of airfoils in the low pressure turbine section divided by the bypass area ratio is less than about 170, said low pressure turbine section airfoil count being the total number of blade airfoils and vane airfoils of the low pressure turbine section.

In additional or alternative embodiments of any of the foregoing embodiments, the bypass area ratio may be greater than about 8.0 or may be between about 8.0 and about 20.0.

In additional or alternative embodiments of any of the foregoing embodiments, a fan case may encircle the fan blades radially outboard of the engine case.

In additional or alternative embodiments of any of the foregoing embodiments, the compressor may comprise a low pressure compressor section and a high pressure compressor section.

In additional or alternative embodiments of any of the foregoing embodiments, the blades of the low pressure compressor section and low pressure turbine section may share a low shaft.

In additional or alternative embodiments of any of the foregoing embodiments, the high pressure compressor section and a high pressure turbine section of the turbine may share a high shaft.

In additional or alternative embodiments of any of the foregoing embodiments, there are no additional compressor or turbine sections.

In additional or alternative embodiments of any of the foregoing embodiments, the speed reduction mechanism may comprise an epicyclic transmission coupling the low speed shaft to a fan shaft to drive the fan with a speed reduction.

In additional or alternative embodiments of any of the foregoing embodiments, the low pressure turbine section may have an exemplary 2 to 6 blade stages or 2 to 3 blade stages.

In additional or alternative embodiments of any of the foregoing embodiments, a hub-to-tip ratio (Ri:Ro) of the low pressure turbine section may be between about 0.4 and about 0.5 measured at the maximum Ro axial location in the low pressure turbine section.

In additional or alternative embodiments of any of the foregoing embodiments, a ratio of maximum gaspath radius along the low pressure turbine section to maximum radius of the fan may be less than about 0.55, or less than about 0.50, or between about 0.35 and about 0.50.

In additional or alternative embodiments of any of the foregoing embodiments, the ratio of low pressure turbine section airfoil count to bypass area ratio may be between about 10 and about 150.

In additional or alternative embodiments of any of the foregoing embodiments, the airfoil count of the low pressure turbine section may be below about 1600.

In additional or alternative embodiments of any of the foregoing embodiments, the engine may be in combination with a mounting arrangement (e.g., of an engine pylon) wherein an aft mount reacts at least a thrust load.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
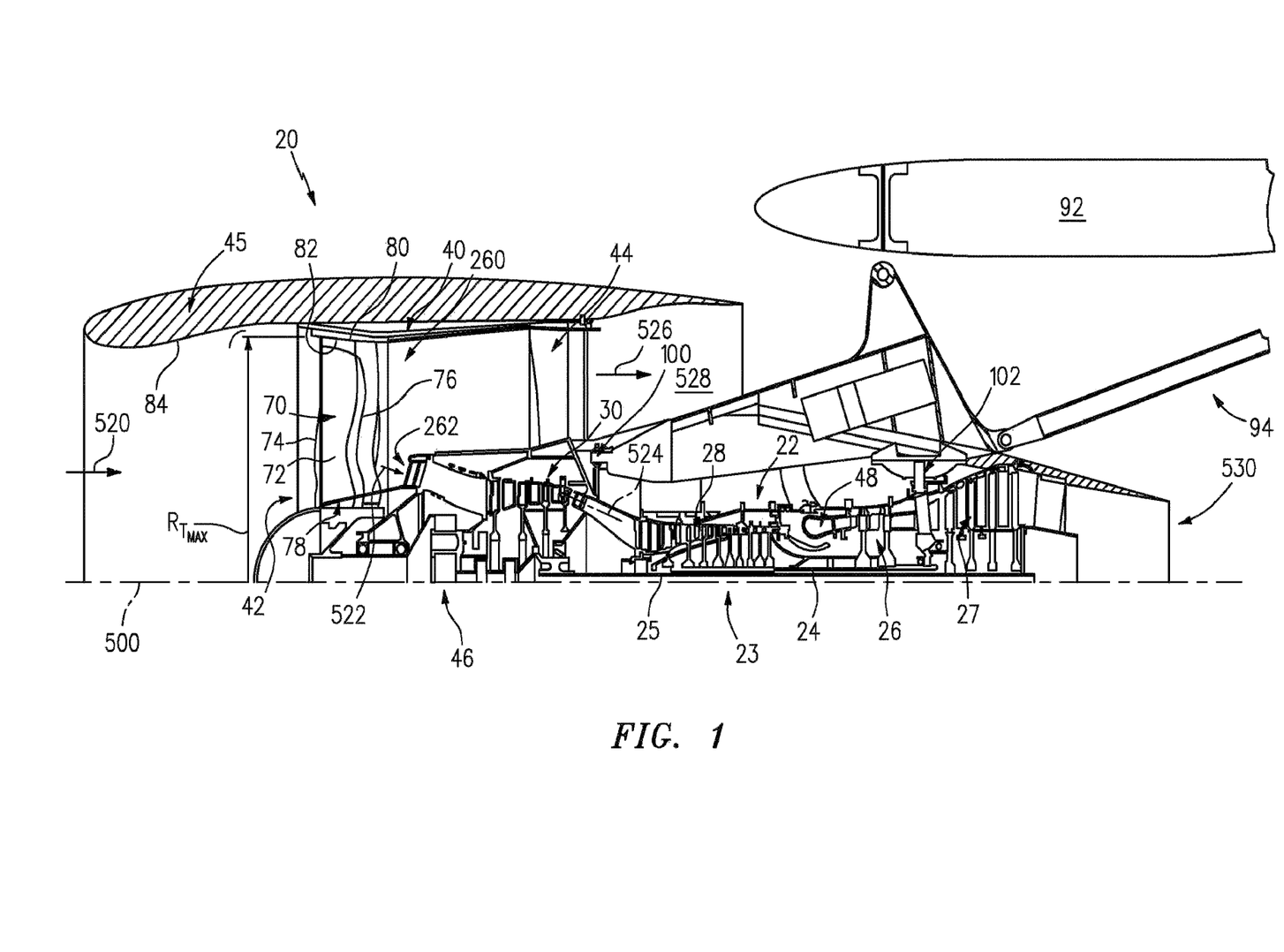
FIG. 1 is an axial sectional view of a turbofan engine.

FIG. 1 shows a turbofan engine 20 having a main housing (engine case) 22 containing a rotor shaft assembly 23. An exemplary engine is a high-bypass turbofan. In such an engine, the normal cruise condition bypass area ratio of air mass flowing outside the case 22 (e.g., the compressor sections and combustor) to air mass passing through the case 22 is typically in excess of about 4.0 and, more narrowly, typically between about 4.0 and about 12.0. Via high 24 and low 25 shaft portions of the shaft assembly 23, a high pressure turbine section (gas generating turbine) 26 and a low pressure turbine section 27 respectively drive a high pressure compressor section 28 and a low pressure compressor section 30. As used herein, the high pressure turbine section experiences higher pressures that the low pressure turbine section. A low pressure turbine section is a section that powers a fan 42. Although a two-spool (plus fan) engine is shown, one of many alternative variations involves a three-spool (plus fan) engine wherein an intermediate spool comprises an intermediate pressure compressor between the low fan and high pressure compressor section and an intermediate pressure turbine between the high pressure turbine section and low pressure turbine section.

The engine extends along a longitudinal axis 500 from a fore end to an aft end. Adjacent the fore end, a shroud (fan case) 40 encircles the fan 42 and is supported by vanes 44. An aerodynamic nacelle around the fan case is shown and an aerodynamic nacelle 45 around the engine case is shown.

The low shaft portion 25 of the rotor shaft assembly 23 drives the fan 42 through a speed reduction mechanism 46. An exemplary speed reduction mechanism is an epicyclic transmission, namely a star or planetary gear system. As is discussed further below, an inlet airflow 520 entering the nacelle is divided into a portion 522 passing along a core flowpath 524 and a bypass portion 526 passing along a bypass flowpath 528. With the exception of diversions such as cooling air, etc., flow along the core flowpath sequentially passes through the low pressure compressor section, high pressure compressor section, a combustor 48, the high pressure turbine section, and the low pressure turbine section before exiting from an outlet 530.

Figure 3:
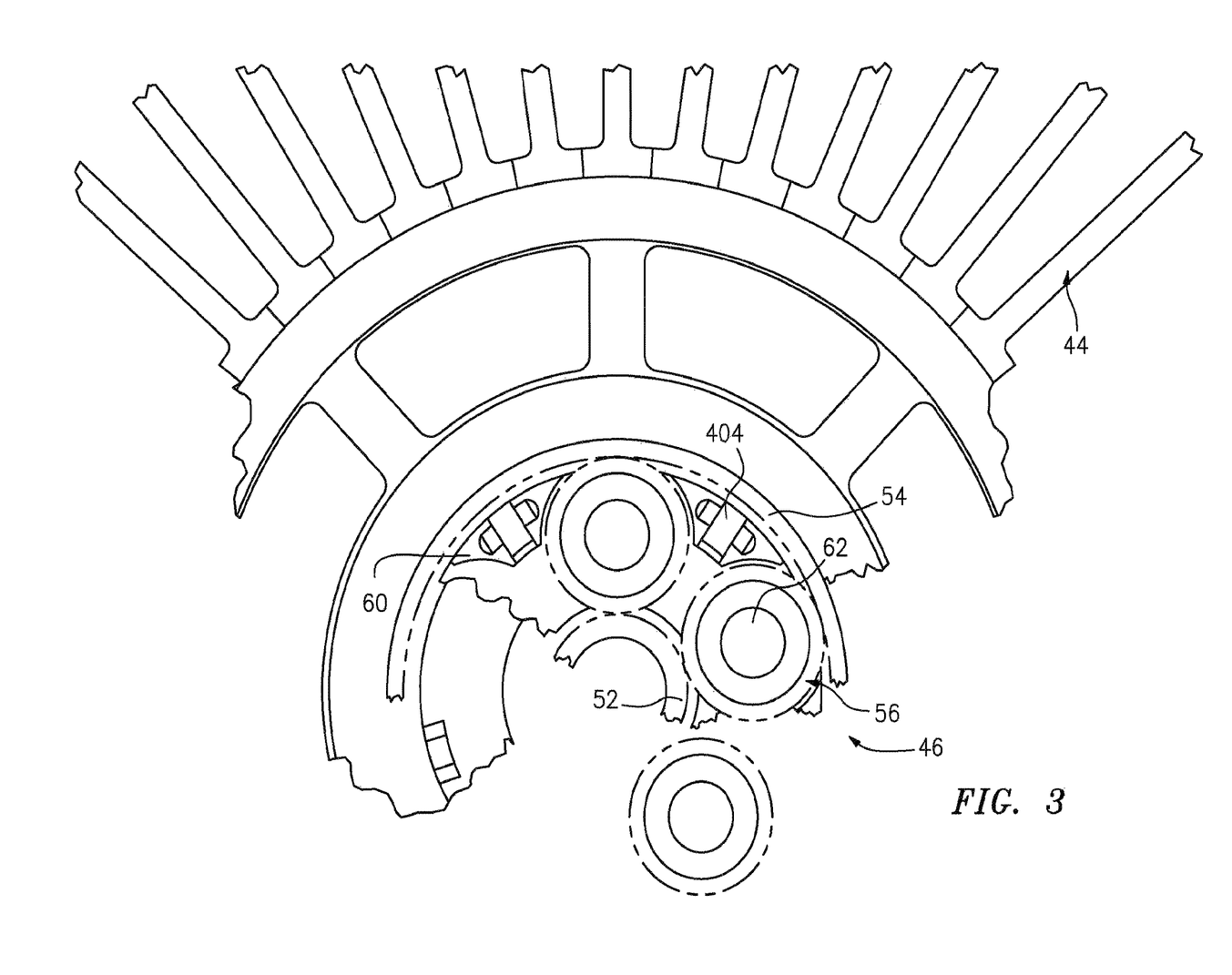
FIG. 3 is transverse sectional view of transmission of the engine of FIG. 1.

FIG. 3 schematically shows details of the transmission 46. A forward end of the low shaft 25 is coupled to a sun gear 52 (or other high speed input to the speed reduction mechanism). The externally-toothed sun gear 52 is encircled by a number of externally-toothed star gears 56 and an internally-toothed ring gear 54. The exemplary ring gear is coupled to the fan to rotate with the fan as a unit.

The star gears 56 are positioned between and enmeshed with the sun gear and ring gear. A cage or star carrier assembly 60 carries the star gears via associated journals 62. The exemplary star carrier is substantially irrotatably mounted relative via fingers 404 to the case 22.

Another transmission/gearbox combination has the star carrier connected to the fan and the ring is fixed to the fixed structure (case) is possible and such is commonly referred to as a planetary gearbox.

The speed reduction ratio is determined by the ratio of diameters within the gearbox. An exemplary reduction is between about 2:1 and about 13:1.

The exemplary fan (FIG. 1) comprises a circumferential array of blades 70. Each blade comprises an airfoil 72 having a leading edge 74 and a trailing edge 76 and extending from an inboard end 78 at a platform to an outboard end 80 (i.e., a free tip). The outboard end 80 is in close facing proximity to a rub strip 82 along an interior surface 84 of the nacelle and fan case.

To mount the engine to the aircraft wing 92, a pylon 94 is mounted to the fan case and/or to the other engine cases. The exemplary pylon 94 may be as disclosed in U.S. patent application Ser. No. 11/832,107 (US2009/0056343A1). The pylon comprises a forward mount 100 and an aft/rear mount 102. The forward mount may engage the engine intermediate case (IMC) and the aft mount may engage the engine thrust case. The aft mount reacts at least a thrust load of the engine.

To reduce aircraft fuel burn with turbofans, it is desirable to produce a low pressure turbine with the highest efficiency and lowest weight possible. Further, there are considerations of small size (especially radial size) that benefit the aerodynamic shape of the engine cowling and allow room for packaging engine subsystems.

Figure 2:
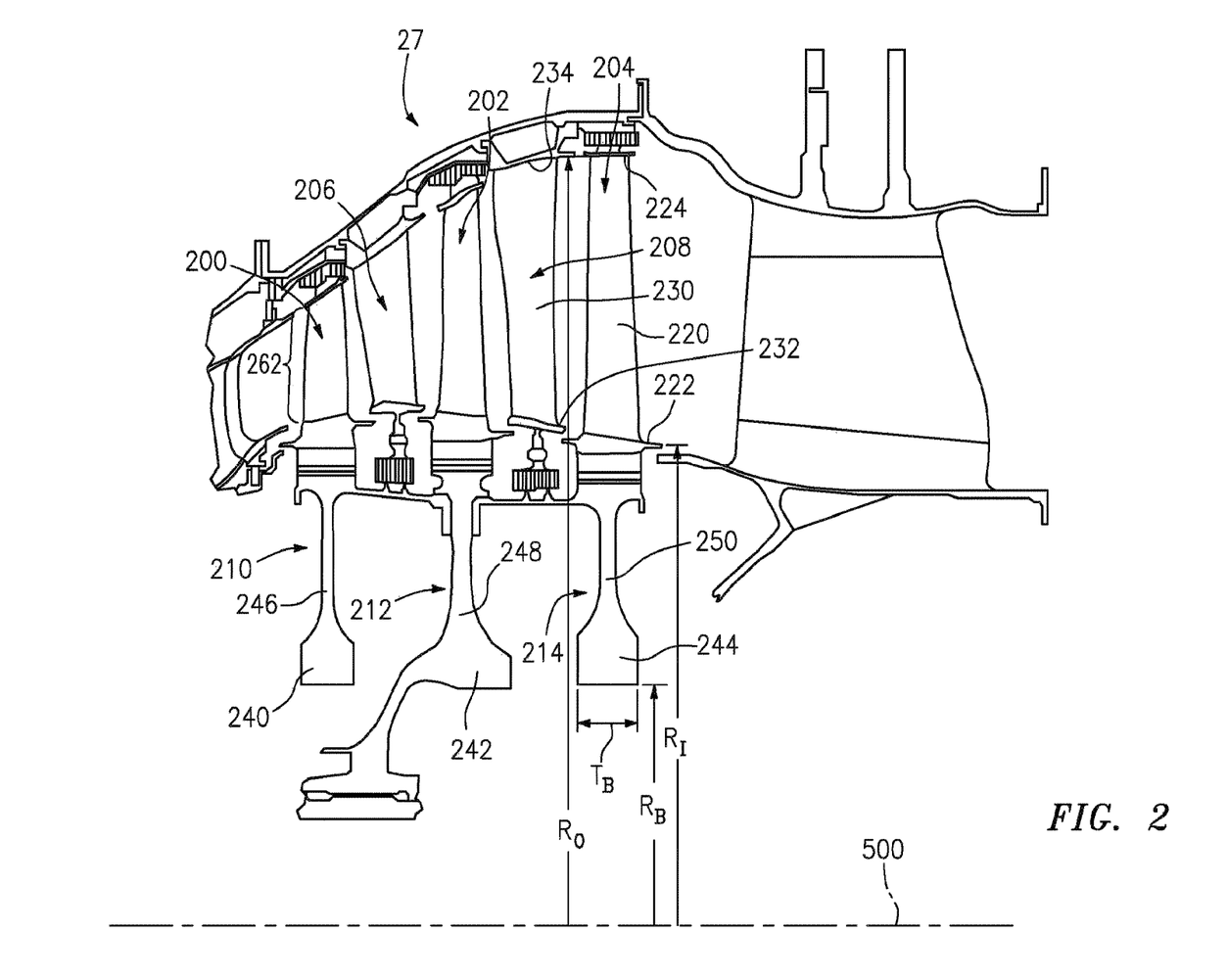
FIG. 2 is an axial sectional view of a low pressure turbine section of the engine of FIG. 1.

FIG. 2 shows the low pressure turbine section 27 as comprising an exemplary three blade stages 200, 202, 204. An exemplary blade stage count is 2-6, more narrowly, 2-4, or 2-3, 3-5, or 3-4. Interspersed between the blade stages are vane stages 206 and 208. Each exemplary blade stage comprises a disk 210, 212, and 214, respectively. A circumferential array of blades extends from peripheries of each of the disks. Each exemplary blade comprises an airfoil 220 extending from an inner diameter (ID) platform 222 to an outer diameter (OD) shroud 224 (shown integral with the airfoil An alternative may be an unshrouded blade with a rotational gap between the tip of the blade and a stationary blade outer air seal (BOAS). Each exemplary shroud 224 has outboard sealing ridges which seal with abradable seals (e.g., honeycomb) fixed to the case. The exemplary vanes in stages 206 and 208 include airfoils 230 extending from ID platforms 232 to OD shrouds 234. The exemplary OD shrouds 234 are directly mounted to the case. The exemplary platforms 232 carry seals for sealing with inter-disk knife edges protruding outwardly from inter-disk spacers which may be separate from the adjacent disks or unitarily formed with one of the adjacent disks.

Each exemplary disk 210, 212, 214 comprises an enlarged central annular protuberance or "bore" 240, 242, 244 and a thinner radial web 246, 248, 250 extending radially outboard from the bore. The bore imparts structural strength allowing the disk to withstand centrifugal loading which the disk would otherwise be unable to withstand.

A turbofan engine is characterized by its bypass ratio (mass flow ratio of air bypassing the core to air passing through the core) and the geometric bypass area ratio (ratio of fan duct annulus area outside/outboard of the low pressure compressor section inlet (i.e., at location 260 in FIG. 1) to low pressure compressor section inlet annulus area (i.e., at location 262 in FIG. 2). High bypass engines typically have bypass area ratio of at least four. There has been a correlation between increased bypass area ratio and increased low pressure turbine section radius and low pressure turbine section airfoil count. As is discussed below, this correlation may be broken by having an engine with relatively high bypass area ratio and relatively low turbine size.

By employing a speed reduction mechanism (e.g., a transmission) to allow the low pressure turbine section to turn very fast relative to the fan and by employing low pressure turbine section design features for high speed, it is possible to create a compact turbine module (e.g., while producing the same amount of thrust and increasing bypass area ratio). The exemplary transmission is a epicyclic transmission. Alternative transmissions include composite belt transmissions, metal chain belt transmissions, fluidic transmissions, and electric means (e.g., a motor/generator set where the turbine turns a generator providing electricity to an electric motor which drives the fan).

Compactness of the turbine is characterized in several ways. Along the compressor and turbine sections, the core gaspath extends from an inboard boundary (e.g., at blade hubs or outboard surfaces of platforms of associated blades and vanes) to an outboard boundary (e.g., at blade tips and inboard surfaces of blade outer air seals for unshrouded blade tips and at inboard surfaces of OD shrouds of shrouded blade tips and at inboard surfaces of OD shrouds of the vanes). These boundaries may be characterized by radii $R_I$ and $R_O$, respectively, which vary along the length of the engine.

For low pressure turbine radial compactness, there may be a relatively high ratio of radial span ($R_O$-$R_I$) to radius ($R_O$ or $R_I$). Radial compactness may also be expressed in the hub-to-tip ratio ($R_I$:$R_O$). These may be measured at the maximum $R_O$ location in the low pressure turbine section. The exemplary compact low pressure turbine section has a hub-to-tip ratio close to about 0.5 (e.g., about 0.4-0.5 or about 0.42-0.48, with an exemplary about 0.46).

Another characteristic of low pressure turbine radial compactness is relative to the fan size. An exemplary fan size measurement is the maximum tip radius $R_{Tmax.}$ of the fan blades. An exemplary ratio is the maximum $R_O$ along the low pressure turbine section to $R_{Tmax.}$ of the fan blades. Exemplary values for this ratio are less than about 0.55 (e.g., about 0.35-55), more narrowly, less than about 0.50, or about 0.35-0.50.

To achieve compactness the designer may balance multiple physical phenomena to arrive at a system solution as defined by the low pressure turbine hub-to-tip ratio, the fan maximum tip radius to low pressure turbine maximum $R_O$ ratio, the bypass area ratio, and the bypass area ratio to low pressure turbine airfoil count ratio. These concerns include, but are not limited to: a) aerodynamics within the low pressure turbine, b) low pressure turbine blade structural design, c) low pressure turbine disk structural design, and d) the shaft connecting the low pressure turbine to the low pressure compressor and speed reduction device between the low pressure compressor and fan. These physical phenomena may be balanced in order to achieve desirable performance, weight, and cost characteristics.

The addition of a speed reduction device between the fan and the low pressure compressor creates a larger design space because the speed of the low pressure turbine is decoupled from the fan. This design space provides great design variables and new constraints that limit feasibility of a design with respect to physical phenomena. For example the designer can independently change the speed and flow area of the low pressure turbine to achieve optimal aerodynamic parameters defined by flow coefficient (axial flow velocity/wheel speed) and work coefficient (wheel speed/square root of work). However, this introduces structural constraints with respect blade stresses, disk size, material selection, etc.

In some examples, the designer can choose to make low pressure turbine section disk bores much thicker relative to prior art turbine bores and the bores may be at a much smaller radius $R_B$. This increases the amount of mass at less than a "self sustaining radius". Another means is to choose disk materials of greater strength than prior art such as the use of wrought powdered metal disks to allow for extremely high centrifugal blade pulls associated with the compactness.

Another variable in achieving compactness is to increase the structural parameter $AN^2$ which is the annulus area of the exit of the low pressure turbine divided by the low pressure turbine rpm squared at its redline or maximum speed. Relative to prior art turbines, which are greatly constrained by fan blade tip mach number, a very wide range of $AN^2$ values can be selected and optimized while accommodating such constraints as cost or a countering, unfavorable trend in low pressure turbine section shaft dynamics. In selecting the turbine speed (and thereby selecting the transmission speed ratio, one has to be mindful that at too high a gear ratio the low pressure turbine section shaft (low shaft) will become dynamically unstable.

The higher the design speed, the higher the gear ratio will be and the more massive the disks will become and the stronger the low pressure turbine section disk and blade material will have to be. All of these parameters can be varied simultaneously to change the weight of the turbine, its efficiency, its manufacturing cost, the degree of difficulty in packaging the low pressure turbine section in the core cowling and its durability. This is distinguished from a prior art direct drive configuration, where the high bypass area ratio can only be achieved by a large low pressure turbine section radius. Because that radius is so very large and, although the same variables (airfoil turning, disk size, blade materials, disk shape and materials, etc.) are theoretically available, as a practical matter economics and engine fuel burn considerations severely limit the designer's choice in these parameters.

Another characteristic of low pressure turbine section size is airfoil count (numerical count of all of the blades and vanes in the low pressure turbine). Airfoil metal angles can be selected such that airfoil count is low or extremely low relative to a direct drive turbine. In known prior art engines having bypass area ratio above 6.0 (e.g. 8.0-20), low pressure turbine sections involve ratios of airfoil count to bypass area ratio above 190.

With the full range of selection of parameters discussed above including, disk bore thickness, disk material, hub to tip ratio, and $R_O/R_{Tmax.}$, the ratio of airfoil count to bypass area ratio may be below about 170 to as low as 10. (e.g., below about 150 or an exemplary about 10-170, more narrowly about 10-150). Further, in such embodiments the airfoil count may be below about 1700, or below about 1600.

Figure 4:
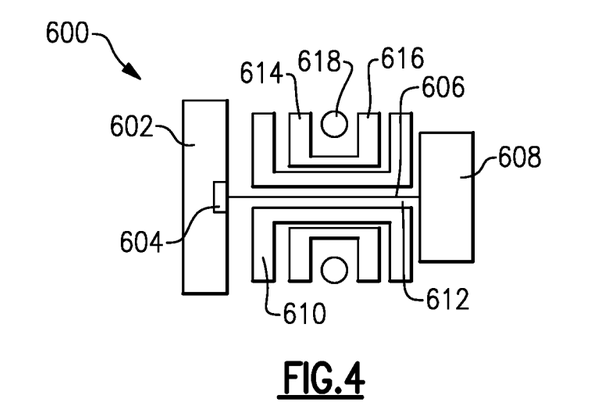
FIG. 4 shows another embodiment.

FIG. 4 shows an embodiment 600, wherein there is a fan drive turbine 608 driving a shaft 606 to in turn drive a fan rotor 602. A gear reduction 604 may be positioned between the fan drive turbine 608 and the fan rotor 602. This gear reduction 604 may be structured and operate like the gear reduction disclosed above. A compressor rotor 610 is driven by an intermediate pressure turbine 612, and a second stage compressor rotor 614 is driven by a turbine rotor 216. A combustion section 618 is positioned intermediate the compressor rotor 614 and the turbine section 616.

Figure 5:
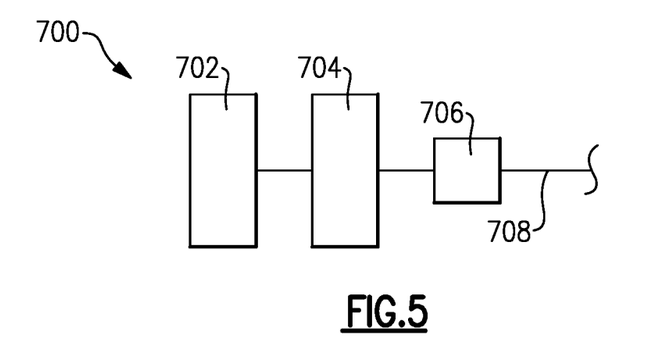
FIG. 5 shows yet another embodiment.

FIG. 5 shows yet another embodiment 700 wherein a fan rotor 702 and a first stage compressor 704 rotate at a common speed. The gear reduction 706 (which may be structured as disclosed above) is intermediate the compressor rotor 704 and a shaft 708 which is driven by a low pressure turbine section.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

The invention claimed is:

1. A turbofan engine comprising:
   a fan including a fan rotor and a circumferential array of fan blades;
   a compressor in fluid communication with the fan, the compressor including a four-stage second compressor section and a nine-stage first compressor section, the second compressor section including a second compressor section inlet with a second compressor section inlet annulus area;
   a fan duct including a fan duct annulus area outboard of the second compressor section inlet, wherein the ratio of the fan duct annulus area to the second compressor section inlet annulus area defines a bypass area ratio between 8.0 and 20.0;
   a combustor in fluid communication with the compressor;
   a shaft assembly having a first portion and a second portion;

a turbine in fluid communication with the combustor, the turbine having a two-stage first turbine section coupled to the first portion of the shaft assembly to drive the first compressor section, and a second turbine section coupled to the second portion of the shaft assembly to drive the fan, the second turbine section being a four-stage turbine section, the second turbine section including blades and vanes, and a second turbine airfoil count defined as the numerical count of all of the blades and vanes in the second turbine section; and a planetary gearbox coupled to the fan and rotatable by the second turbine section through the second portion of the shaft assembly to allow the second turbine section to turn faster than the fan, the gearbox having a speed reduction ratio between 2:1 and 13:1 determined by the ratio of diameters within the gearbox, and wherein the planetary gearbox is intermediate the second compressor section and the second portion of the shaft assembly such that the fan rotor and the second compressor section are rotatable at a common speed;

wherein a ratio of the second turbine airfoil count to the bypass area ratio is less than 150, and wherein the second turbine section further includes a maximum gas path radius and the fan blades include a maximum radius, and a ratio of the maximum gas path radius to the maximum radius of the fan blades is less than 0.55.

2. The turbofan engine as recited in claim 1, further comprising a fan case and vanes, the fan case encircling the fan and supported by the vanes.

3. The turbofan engine as recited in claim 2, wherein the fan is a single fan, and each fan blade includes a platform and an outboard end having a free tip.

4. The turbofan engine as recited in claim 3, wherein the gearbox carries a plurality of gears associated with journals.

5. The turbofan engine as recited in claim 3, further comprising:

an engine aft mount location to support an engine mount when the engine is mounted and react at least a thrust load of the engine; and an engine forward mount location.

6. The turbofan engine as recited in claim 5, wherein the engine forward mount location is axially proximate to the gearbox.

7. The turbofan engine as recited in claim 6, wherein the engine forward mount location engages with an intermediate case.

8. The turbofan engine as recited in claim 5, wherein the engine aft mount location engages with an engine thrust case.

9. The turbofan engine as recited in claim 8, wherein the engine aft mount location is located between the second turbine section and the first turbine section.

10. The turbofan engine as recited in claim 1, wherein the second turbine section includes a plurality of blade stages interspersed with a plurality of vane stages, and each stage of the second turbine section includes a disk with a circumferential array of blades, each blade including an airfoil extending from an inner diameter to an outer diameter, wherein the inner diameter is associated with a platform and the outer diameter is associated with a shroud.

11. The turbofan engine as recited in claim 10, wherein in at least one stage the shroud is integral with the airfoil.

12. The turbofan engine as recited in claim 11, wherein the shroud includes outboard sealing ridges configured to seal with abradable seals.

13. The turbofan engine as recited in claim 12, wherein the abradable seals include honeycomb.

14. The turbofan engine as recited in claim 13, further comprising a case associated with the second turbine section, wherein the abradable seals are fixed to the case.

15. The turbofan engine as recited in claim 14, wherein each stage of the second turbine section includes a disk, with a circumferential array of blades, each blade including an airfoil extending from an inner diameter to an outer diameter, wherein the inner diameter is associated with a platform and the outer diameter is unshrouded.

16. The turbofan engine as recited in claim 14, further comprising a stationary blade outer air seal, and a rotational gap between the tip and the stationary blade outer air seal.

17. The turbofan engine as recited in claim 16, wherein each of the plurality of vane stages includes a vane, each vane including an airfoil extending from an inner diameter to an outer diameter, wherein the inner diameter is associated with a platform and the outer diameter is associated with a shroud.

18. The turbofan engine as recited in claim 17, further comprising a case associated with the second turbine section, wherein the shroud is fixed to the case.

19. The turbofan engine as recited in claim 18, wherein each platform carries a seal.

20. The turbofan engine as recited in claim 1, wherein a hub-to-tip ratio ($R_i$:$R_o$) of the second turbine section is between 0.4 and 0.5 measured at the maximum $R_o$ axial location in the second turbine section.

21. A turbofan engine comprising:

a fan including a fan rotor and a circumferential array of fan blades;

a compressor in fluid communication with the fan, the compressor including a second compressor section and a first compressor section, the second compressor section including a second compressor section inlet with a second compressor section inlet annulus area;

a fan duct including a fan duct annulus area outboard of the second compressor section inlet, wherein the ratio of the fan duct annulus area to the second compressor section inlet annulus area defines a bypass area ratio between 8.0 and 20.0;

a combustor in fluid communication with the compressor;

a shaft assembly having a first portion and a second portion;

a turbine in fluid communication with the combustor, the turbine having a first turbine section coupled to the first portion of the shaft assembly to drive the first compressor section, and a second turbine section coupled to the second portion of the shaft assembly to drive the fan, the second turbine section including blades and vanes, and a second turbine airfoil count defined as the numerical count of all of the blades and vanes in the second turbine section; and a planetary gearbox coupled to the fan and rotatable by the second turbine section through the second portion of the shaft assembly to allow the second turbine section to turn faster than the fan, the gearbox having a speed reduction ratio between 2:1 and 13:1 determined by the ratio of diameters within the gearbox, and wherein the planetary gearbox is intermediate the second compressor section and the second portion of the shaft assembly such that the fan rotor and the second compressor section are rotatable at a common speed;

wherein a ratio of the second turbine airfoil count to the bypass area ratio is less than 150; wherein the second turbine section further includes a maximum gas path radius and the fan blades include a maximum radius, and a ratio of the maximum gas path radius to the maximum radius of the fan blades is less than 0.55, and wherein a hub-to-tip ratio (Ri:Ro) of the second turbine section is between 0.4 and 0.5 measured at the maximum Ro axial location in the second turbine section.

22. The turbofan engine as recited in claim 21, wherein the first turbine is a two-stage first turbine and the second turbine section is a four-stage second turbine.

23. The turbofan engine as recited in claim 22, wherein the first compressor is a nine-stage first compressor.

24. The turbofan engine as recited in claim 23, wherein the second compressor is a four-stage second compressor.

25. The turbofan engine as recited in claim 23, further comprising a fan case and vanes, the fan case encircling the fan and supported by the vanes, and wherein the gearbox carries a plurality of gears associated with journals.

26. The turbofan engine as recited in claim 23, further comprising an engine intermediate case, including an engine forward mount location proximate to the gearbox and configured to support an engine mount when the engine is mounted, and an engine thrust case including an engine aft mount location configured to support an engine mount and react at least a thrust load when the engine is mounted, wherein the engine aft mount location is located between the second turbine section and the first turbine section.

27. The turbofan engine as recited in claim 21, wherein:
the fan is a single fan;
the ratio of the maximum gas path radius to the maximum radius of the fan blades is between 0.35 and 0.50; and
the hub-to-tip ratio (Ri:Ro) is between 0.42 and 0.48.

* * * * *